July 28, 1925. 1,547,592

H. A. LARNER

LOADING AND UNLOADING TRUCK

Filed May 10, 1922  2 Sheets-Sheet 1

Inventor
Herbert A. Larner,
By Watson E. Coleman
Attorney

July 28, 1925.

H. A. LARNER 1,547,592

LOADING AND UNLOADING TRUCK

Filed May 10, 1922     2 Sheets-Sheet 2

Inventor

Herbert A. Larner.

By Watson E. Coleman
Attorney

Patented July 28, 1925.

1,547,592

UNITED STATES PATENT OFFICE.

HERBERT A. LARNER, OF STAUNTON, VIRGINIA.

LOADING AND UNLOADING TRUCK.

Application filed May 10, 1922. Serial No. 559,782.

*To all whom it may concern:*

Be it known that I, HERBERT A. LARNER, a citizen of the United States, residing at Staunton, in the county of Augusta and State of Virginia, have invented certain new and useful Improvements in Loading and Unloading Trucks, of which the following is a specification, reference being had to the accompanying drawings.

This invention relates to transporting devices, and particularly to trucks for moving material, such as stone, coal, dirt, bricks, and the like.

It is common in quarries to provide small cars operating on tracks and by which the rocks and stone are conveyed to the stone crushers, and it is necessary to shift the tracks to a pile of stone, move the car on the tracks to the stone pile, load the car, and then run the car back to the crusher. This requires the services of from ten to twelve men ordinarily.

The general object of my invention is to provide a truck which is particularly adapted for use in quarries, though not limited thereto, and which will do away with the necessity of the cars and the tracks on which the cars run.

A further object of the invention is to provide a construction of this character which includes trays upon which the material at the quarry is discharged, and provide a car or truck so constructed that it may lift up a loaded tray, carry the tray to the dumping place, and then discharge the contents of the tray. Thus while one tray is being taken to the crusher or other point of discharge, other trays are being loaded ready for the truck. This minimizes the amount of labor involved in transportation and further very much increases the output.

A still further object is to provide a mechanism of this character which may be readily operated by one man to either raise or discharge the load, thus permitting other laborers to remain at their work in the quarry.

Another object is to provide a construction of this kind in the nature of an attachment, which may be readily applied to the chassis of trucks already on the market.

Other objects will appear in the course of the following description.

My invention is illustrated in the accompanying drawings, wherein:—

Figure 1:
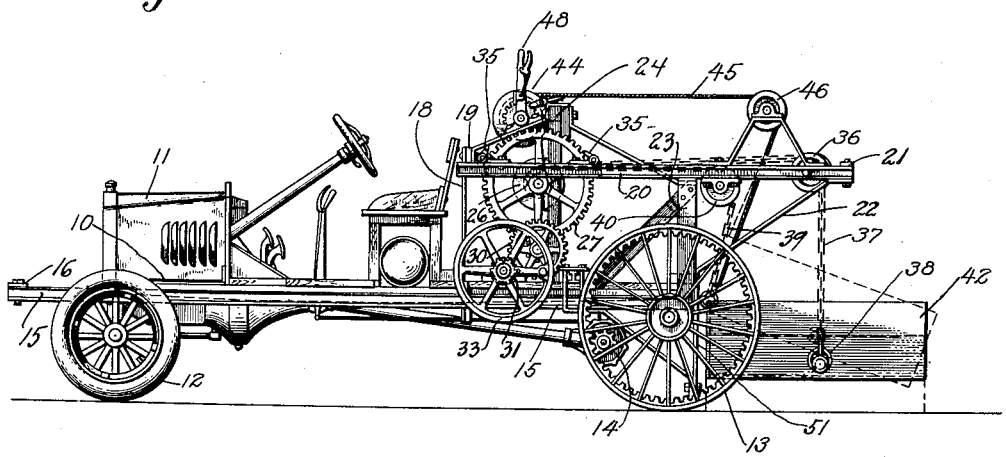
Figure 1 is a side elevation of a truck constructed in accordance with my invention.
Figure 2:
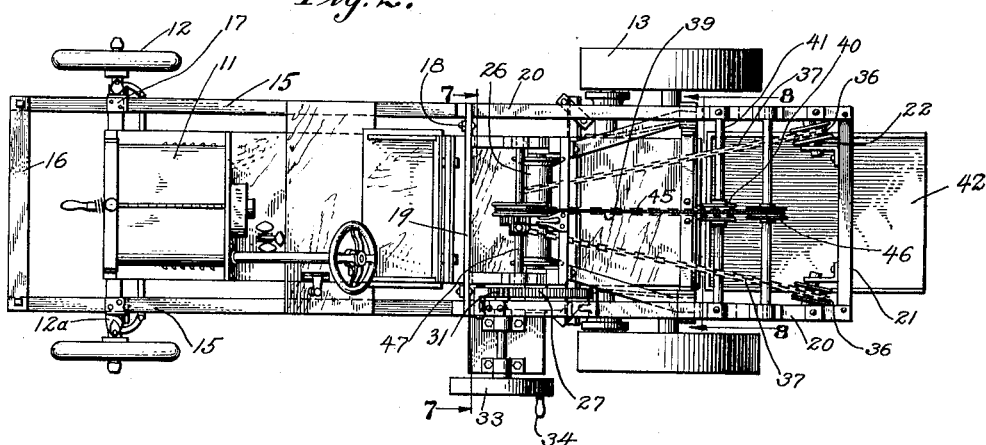
Figure 2 is a top plan view of the construction shown in Figure 1.
Figure 3:
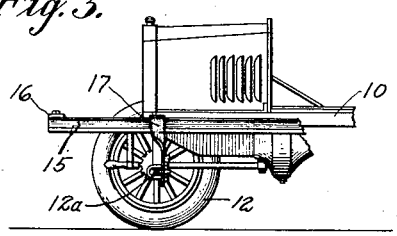
Figure 3 is a fragmentary front view of the truck showing the manner in which my loading attachment is applied to the front axle.
Figure 4:
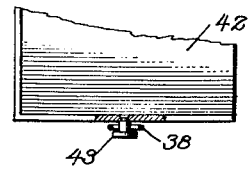
Figure 4 is a fragmentary top plan view of the tray 42 partly in section.
Figure 5:
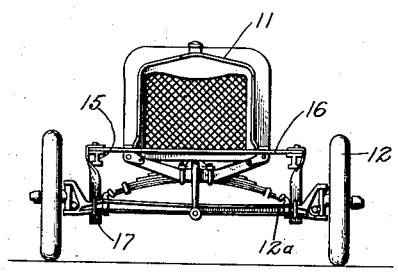
Figure 5 is a front elevation of the forward end of the truck showing the supporting framework of the machine.
Figure 6:
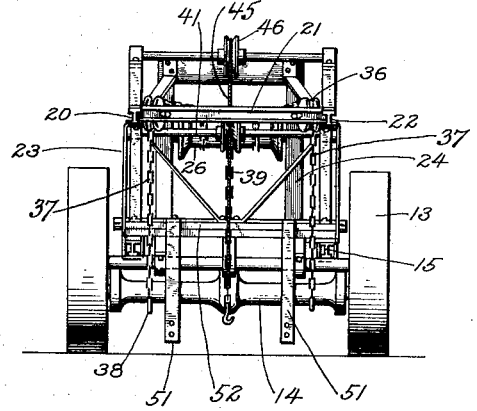
Figure 6 is a rear elevation of the truck with my attachment applied.
Figure 7:
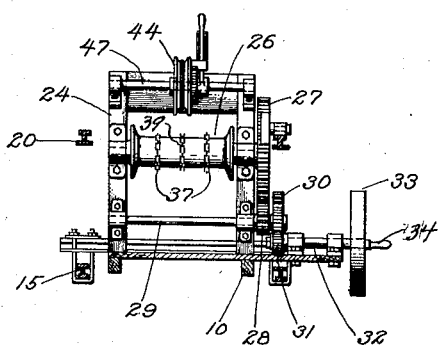
Figure 7 is a vertical sectional view on the line 7—7 of Figure 2.
Figure 8:
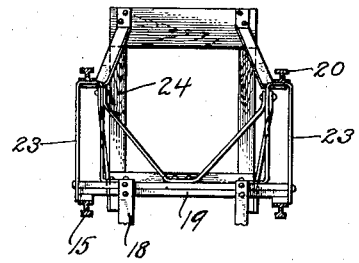
Figure 8 is a section on the line 8—8 of Figure 2.
Figure 10:
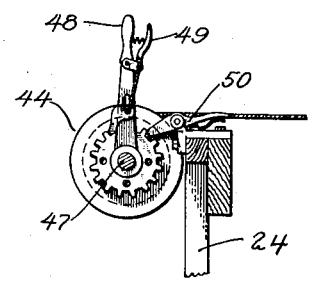
Figure 10 is a sectional view showing the mechanism for operating the winding reel 44.
Figure 9:
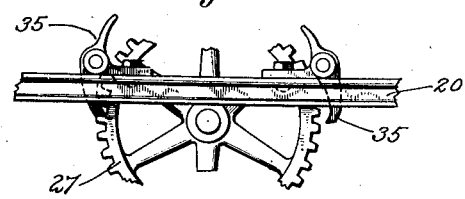
Figure 9 is a fragmentary side elevation showing the wheel 27 and the pawls coacting therewith.

Referring to these drawings, it will be seen that I have illustrated the chassis of an ordinary truck of well known construction, designated generally 10, 11 being the hood enclosing the engine, 12 the front wheels, 13 the rear wheels, and 14 the usual drive shaft. All these parts are of ordinary and common construction.

Mounted upon the truck are longitudinal beams 15. These at their forward ends are connected to each other by a transverse cross bar 16 and are supported by vertical members 17 which are fastened by U-bolts or other suitable means to the front axle 12ª. These beams 15 extend beyond the rear axle 14 and rest upon the housing of the rear axle and are attached thereto in any suitable manner. Extending upward from these members 15 are rods or standards 18 connected by a cross piece 19, and from the ends of this cross piece 19 extend rearwardly the supporting frame bars 20 which are connected at their rear ends by a cross bar 21 suitably braced, as at 22. These frame bars 20 rest upon uprights 23 and 24. The uprights 24 extend above the uprights 23. Transverse braces connect the pairs of uprights and any suitable bracing may be used to make the frame rigid.

Mounted upon the supporting frame forward of the rear axle housing, and specifically upon the uprights 24, is a winding drum 26, the shaft of which carries the gear wheel 27. This gear wheel 27 is engaged by a pinion 28 mounted upon a shaft 29, this shaft carrying the gear wheel 30, which in turn is engaged by a pinion 31 on the shaft 32. This shaft 32 is mounted in suitable bearings and carries at its outer end a fly wheel 33 having a crank handle 34 whereby it may be operated. Engaging the gear wheel 27 are pawls 35 which may be thrown into or out of coaction with the gear wheel 27 to hold the gear wheel from reverse movement. The drum 26 is, of course, mounted to rotate with the shaft on which it is mounted.

Mounted upon the frame formed by the longitudinal bars 20 and the cross bar 21 and at the corners of the frame are the two pulleys 36, and chains 37 pass from the drum 26 over the pulleys 36, these chains having eyes 38 at their extremities. Also extending from the drum 26 is a chain 39 which passes over a pulley 40 carried by a shaft 41, which chain is adapted to be detachably engaged with the forward end of a tray 42. The sides of this tray are provided with outwardly projecting trunnions 43 with which the eyes 38 are adapted to engage. Preferably these trunnions are disposed at the middle of the tray or slightly rearward of the middle thereof. The chain 39 is wound up or paid out with the chains 37.

For the purpose of dumping the tray 42, that is for raising the forward end of the tray to discharge the contents thereof, I provide a winding drum 44 to which is attached one end of a wire or cable 45 which passes over a pulley 46 mounted upon a transverse shaft 47, this cable being attached to the chain 39 adjacent its point of attachment to the tray. For the purpose of rotating the winding drum 44, I provide a handle 48 which is oscillatably mounted upon the shaft 47 and is provided with a pawl engaging teeth on the gear teeth attached to the pulley 44, this pawl being shiftable into or out of engagement with the teeth by the pivoted finger operated member 49 of obvious construction. By oscillating the arm 48, it is obvious that the drum 44 will be rotated in a direction to lift up on the forward end of the tray 42 to thereby discharge the contents of the tray. A pawl 50 will be provided, of course, to hold the drum 44 from reverse movement. The pawl, however, may be shifted out of engagement with the teeth on the drum 44 to permit the release of cable 45.

In order to prevent the tray from striking against the rear axle or swinging forward, I mount upon the rear end of the frame the downwardly extending bumpers 51 which extend downward from the cross piece 52, and the lower ends of these bumpers extend upward and forward and are attached to the frame in any suitable manner.

The operation of this mechanism will be obvious. When it is desired to carry the load from the quarry or from one point to another, the truck is backed up over the loaded tray and the chains 37 are engaged with the studs or trunnions 43 and the chain 39 engaged with the forward end of the tray. The wire 45 at this time is relatively slack. After the chains are engaged with the tray, the winding drum 26 is turned through the hand wheel 33 until the tray has been elevated to the desired amount. Then the pawl 35 will hold the gearing from reverse movement and hold the tray raised. The truck then moves off to the point of deposit and when this point is reached, the cable 45 is wound upon the winding drum 44 by means of the handle 48, which raises the forward end of the tray and causes the discharge of the material.

Any number of trays may be used with this machine. A tray can be hooked up and unhooked in a few seconds. The tray may be lifted to any desired height so as to clear all obstacles or secure the proper inclination of the tray in order to discharge it. When desired to load the tray, the truck may be backed up and the tray lowered at an inclination and the rear edge of the tray forced beneath the material in the manner of a scraper or bucket, thus assisting in loading the tray. With this machine, when it is used in a quarry immediately after a blast, the material may be rapidly conveyed to the crusher without the necessity of putting down track. By using this machine and trays, the men operating the quarry never had to leave the stone pile to move cars, as they have to do with tracks.

I do not wish to be limited to the exact embodiment of the mechanism illustrated, though I have found this embodiment entirely practical in actual operation, as it is obvious that many changes might be made in the details of construction and arrangement of parts without departing from the spirit of the invention. Thus, for instance, in place of the hand operated wheel 33 for hoisting the loaded tray, a power operated wheel might be used and the engine of the truck used to operate this wheel. It is obvious also that the detailed construction of the frame might be changed in many ways. Further, it is obvious that trucks might be constructed initially with this hoisting mechanism thereon and be within the purview of my invention.

I claim:—

1. The combination with a truck chassis, of a supporting frame mounted thereon and extending beyond the rear end thereof, transversely aligned pulleys mounted on the supporting frame and disposed beyond the rear end of the truck and laterally spaced from each other, a pulley mounted upon the supporting frame medially with relation to said frame and forward of the first named pulleys, a winding drum on the frame, flexible connections passing from said winding drum over the first named pulleys and extending directly downward, a second winding drum mounted upon the frame, a flexible connection passing from the second named winding drum over the second named pulley and extending directly downward, a tray with which the first named flexible connections are detachably connected at the sides of the tray and approximately at the middle thereof, the second named flexible connection having operative detachable engagement with the forward end of the tray, means for applying power to the first named winding drum to raise or lower said first named flexible connections to the tray, and independent manually operable means for operating the second named drum to thereby wind up or unwind the second named connection.

2. The combination with a truck chassis, of a supporting frame mounted upon the chassis and extending rearward therefrom and beyond the rear end of the chassis, laterally spaced pulleys carried upon the rear end of the supporting frame, a pulley carried upon the supporting frame medially with relation to the first named pulleys and forward thereof and approximately above the rear end of the chassis, a winding drum mounted upon the supporting frame, flexible connections passing from said winding drum over the first named pulleys and then directly downward, a flexible connection passing from said winding drum over the second named pulley and directly downward, a tray with which the first named flexible connections are detachably connected at approximately the middle of the tray, the second named flexible connection being detachably connected to the forward end of the tray, means for operating the winding drum, and means independent of said drum and flexible connections for raising the forward end of the tray to dump the same.

3. The combination with a truck, of a supporting frame mounted thereon and extending rearward therefrom, pulleys carried by the rear end of the supporting frame, a winding drum mounted upon the supporting frame and having means whereby it may be rotated in either direction, flexible connections attached to the winding drum and passing over said pulleys, a tray detachably engaged with the flexible connections at the middle of the tray, a pulley rearward of the first named pulleys, a flexible connection attached to the winding drum and passing over said last named pulley and engaged with the forward end of the tray, a manually operable winding device, a cable attached thereto, a pulley on the supporting frame over which the cable passes, the cable being connected to the second named flexible connection adjacent the point of attachment of the tray whereby said tray may be dumped.

In testimony whereof I hereunto affix my signature.

HERBERT A. LARNER.